US005905309A

United States Patent [19]
Ohmi et al.

[11] Patent Number: 5,905,309

[45] Date of Patent: May 18, 1999

[54] STARTER WITH SHOCK ABSORBING DEVICE

[75] Inventors: Masanori Ohmi, Anjo; Keiichi Matsushima, Toyota; Tsutomu Shiga, Nukata-gun; Yasuhiro Nagao, Okazaki, all of Japan

[73] Assignee: Denso Corporation, Kariya, Japan

[21] Appl. No.: 08/863,002

[22] Filed: May 23, 1997

Related U.S. Application Data

[63] Continuation-in-part of application No. 08/798,133, Feb. 12, 1997.

[30] Foreign Application Priority Data

| | | | |
|---|---|---|---|
| Feb. 15, 1996 | [JP] | Japan | 8-27462 |
| Jun. 27, 1996 | [JP] | Japan | 8-167195 |
| Dec. 6, 1996 | [JP] | Japan | 8-326365 |

[51] Int. Cl.[6] ..................... F02N 11/04; H02P 9/04

[52] U.S. Cl. ..................... 290/36 R; 290/38 A; 290/38 R; 290/46; 290/49; 74/7 A; 74/7 E

[58] Field of Search ..................... 290/38 A, 38 R, 290/46, 49; 74/7 A, 7 E, 411, 785, 801; 310/83

[56] References Cited

U.S. PATENT DOCUMENTS

| | | | |
|---|---|---|---|
| 4,503,719 | 3/1985 | Hamano | 74/7 E |
| 4,635,489 | 1/1987 | Imamura et al. | 74/7 E |
| 4,680,979 | 7/1987 | Morishita et al. | 74/7 E |
| 4,848,172 | 7/1989 | Morishita | 74/7 E |
| 4,891,996 | 1/1990 | Isozumi et al. | 74/6 |
| 5,267,918 | 12/1993 | Shiroyama | 475/331 |
| 5,323,663 | 6/1994 | Ohgi et al. | 74/7 E |
| 5,688,203 | 11/1997 | Yamamoto et al. | 475/331 |

FOREIGN PATENT DOCUMENTS

| | | | |
|---|---|---|---|
| 57-55970 | 12/1982 | Japan | 290/36 R |
| 63-266166 | 11/1988 | Japan | 290/36 R |

*Primary Examiner*—Elvin G. Enad
*Attorney, Agent, or Firm*—Pillsbury Madison & Sutro LLP

[57] ABSTRACT

In a starter having a planetary gear reduction mechanism and a shock absorbing device, a first friction plate of the shock absorbing device is engaged with an internal gear of the reduction mechanism to restrict the internal gear from rotating. A space is provided radially between the internal gear and a housing to allow rotation of the internal gear upon application of an impact shock. A cylindrical member which is harder than the housing is disposed between the space relatively movably against the housing and the internal gear so that the internal gear is restricted from directly contacting the housing.

6 Claims, 6 Drawing Sheets

STARTER WITH SHOCK ABSORBING DEVICE

CROSS REFERENCE TO RELATED APPLICATION

This application is a continuation-in-part of Nagao U.S. patent application Ser. No. 08/798,133 filed on Feb. 12, 1997 which claims priorities of Japanese patent applications No. 8-27462 and No. 8-326365.

BACKGROUND OF THE INVENTION

1. Field of the Invention

The present invention relates to a starter for cranking an engine.

2. Related Art

A conventional starter is disclosed in Japanese Examined Utility Model Publication No. Sho 57-55970.

The starter is comprised of a planetary gear reduction mechanism for reducing the speed of starting motor rotation, and a one-way clutch for transmitting to an output shaft the motor rotation reduced by the planetary gear reduction mechanism. Planetary gears of the planetary gear reduction mechanism are rotatably mounted to the outer member of the one-way clutch by press-fitting or like mounting method. That is, the one-way clutch is unmovably arranged with respect to the output shaft so that only a pinion is fitted on the output shaft so as to be axially movable via a helical spline. Thus it becomes possible to decrease a force required to move the pinion as compared with the structure in which the one-way clutch and the pinion will move together on the output shaft, thereby enabling miniaturizing a magnet switch which is operated when the pinion moving force is required.

The center of the outer member will be determined by a relation of gears constituting the planetary gear reduction mechanism by directly securing, to the outer member, the pin supporting the corresponding planetary gear. However, since the outer member is a component part of the one-way clutch, the center of the outer member is determined by a relation between an inner member and a roller. It is, therefore, necessary that the center of the outer member determined on the reduction mechanism side corresponds to the center of the outer member determined on the clutch side; the function of the clutch and the life of the reduction mechanism largely depend upon the centering accuracy. Consequently, parts making up the reduction mechanism and the clutch are required to have a high dimensional accuracy, resulting in a high cost. Especially when miniaturization is pursued, further enhancement of the dimensional accuracy will be needed.

In another conventional starter having a planetary gear reduction mechanism and a shock absorbing device, an internal gear turns against a housing to absorb a shock applied to the reduction mechanism. When the internal gear turns in an eccentric condition because of backlash between gears, the outer peripheral surface of the internal gear slides frictionally on the inner peripheral surface of the housing. The housing generally made of an aluminum alloy or the like wears more than the internal gear made of resin reinforced by impregnation of glass fibers. Thus, aluminum wear powder is produced by the sliding of the outer periphery of the internal gear along the inner periphery of the housing, thereby causing the housing to become thinned and weakened. Further, the wear powder from the housing will enter bearings and gear engagement portion of the reduction mechanism, causing abnormal noise.

To counter this drawback, it is proposed in Japanese Unexamined Patent Publication No. 63-266166 to dispose wavy ring springs between the inner periphery of the hosing and the outer periphery of the internal gear as well as between the inner peripheries of the planetary gears and the outer periphery of support pins for the planetary gears. Thus, even when the internal gear turns eccentrically, the internal gear and the planetary gears are enabled by the resilient force of the springs to swing against respective radial centers and engage properly.

According to this starter, however, a relative movement occurs between the ring spring and the internal gear at the time of turning of the internal gear, because the ring spring is disposed stationary to the housing by the respective resiliency. Thus, friction occurs unavoidably between the contacting portions, i.e., between the ring spring and the internal gear.

SUMMARY OF THE INVENTION

It is therefore an object of the present invention to provide a starter having a planetary gear reduction mechanism, in which frictional wear caused between contacting surfaces at the time of turning of an internal gear is reduced by a shock absorbing device.

According to the present invention, in addition to a shock absorbing device, a generally cylindrical member is disposed in a space provided between the inner periphery of a housing and the outer periphery of an internal gear to be relatively rotatable against the housing and the internal gear. The cylindrical member rotates relatively against the housing and the internal gear at the time of turning of the internal gear. The relative rotation speed differences between the housing and the cylindrical member and between the cylindrical member and the internal gear become smaller than that between the internal gear and the housing. As a result, even when the eccentric turning of the internal gear causes contacting between the outer periphery of the cylindrical member and the inner periphery of the housing and contacting between the inner periphery of the cylindrical member and the outer periphery of the internal gear thus causing the wear at the contacting portions, the degree of wear is reduced compared to the case of conventional direct contact between the outer periphery of the internal gear and the inner periphery of the housing.

Preferably, the cylindrical member has the axial length which is substantially equal to the axial distance between a partition wall and a center casing. Thus, the cylindrical member operates also as a spacer which defines the axial spacing between the partition plate and the center casing. In addition, the cylindrical member restricts the center casing from moving toward the partition plate even when the center casing is pressed toward the motor side through an output shaft by a helical spline at the time of engagement of a pinion with an engine ring gear.

BRIEF DESCRIPTION OF THE DRAWINGS

Other objects, features and advantages of the present invention will become more apparent from the following description and the appended claims, taken in conjunction with the accompanying drawings, in which:

DETAILED DESCRIPTION OF PRESENTLY PREFERRED EMBODIMENTS

Figure 1:
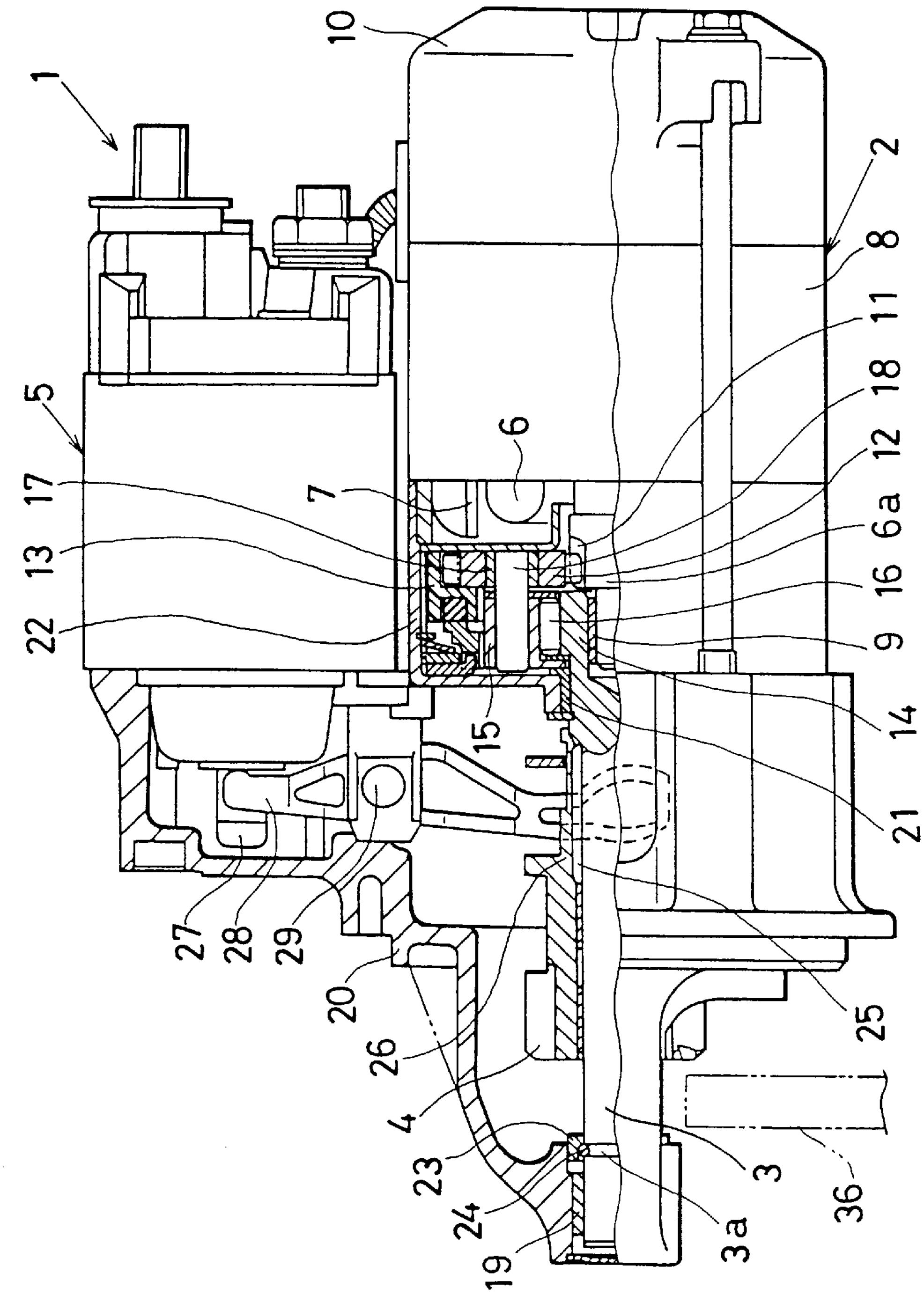
FIG. 1 is a partial sectional view of a starter according to a first embodiment of the present invention.

Next, a starter of the present invention will be described with reference to preferred embodiments shown in the accompanying drawings throughout which the same or similar parts are designated by the same reference numerals to omit repeated description.

(First Embodiment)

A starter 1 of the present embodiment comprises a starting motor 2 which produces a torque when supplied with the electric power; a planetary gear reduction mechanism which reduces the rotational speed of the starting motor 2; a one-way clutch which transmits the rotation thus reduced by the reduction mechanism; a pinion gear 4 fitted movably on the outer periphery of an output shaft 3; a shock absorbing device which absorbs an excess torque added to the driving system; and a magnet switch 5 which generates a force to move the pinion gear 4 forward and controls the electric power supply to the starting motor 2.

The starting motor 2 is a known direct-current motor composed of an armature 6, fixed poles 7, and a cylindrical yoke 8. When a key switch (not shown) is operated to ON and a motor contact provided within the magnetic switch 5 is closed, the armature 6 is turned with the power supplied from a vehicle-mounted battery (not shown). An armature shaft 6*a* is rotatably supported at the forward end by a bearing 9 within a recess formed at the rear center part of the output shaft 3, and is rotatably supported at the rear end by a bearing (not shown) in an end cover 10.

The reduction mechanism comprises a sun gear 11 formed on the outer periphery of the armature shaft 6*a*, a plurality of planetary gears 12 engaged with the sun gear 11, and an internal gear 13 engaged with each of the planetary gears 12. The reduction mechanism is of such a design that with the rotation of the sun gear 11 on the armature shaft 6*a*, each planetary gear 12 rotates while revolving around the outer periphery of the sun gear 11. The force of rotation is transmitted to the output shaft 3 through the one-way clutch.

The one-way clutch includes an inner member 14 formed integrally with the rear end of the output shaft 3, an outer member 15 positioned radially oppositely to the outer periphery of the inner member 14, a plurality of rollers 16 housed in corresponding wedge-type cam chambers (not shown) formed between the outer member 15 and the inner member 14, and springs (not shown) pressing the roller 16 toward the narrow part of the cam chamber. In the one-way clutch, pins 18 rotatably supporting the corresponding planetary gears 12 through corresponding bearings 17 are fixed by pressing into the outer member 15, so that the outer member 15 rotates with the revolution of the planetary gears 12.

The output shaft 3 is arranged coaxially with the armature shaft 6*a* at the front of the armature shaft 6*a*, and is rotatably supported by a bearing 19 at the front end portion of a front housing 20 and is also rotatably supported by a bearing 21 in the small-diameter portion of a center casing 22. On the front end portion of the output shaft 3, a stopper collar 23 for restricting the axial advance position of the pinion gear 4 is mounted. The stopper collar 23 is engaged with a snap ring 24 which is fitted in a groove 3*a* formed in the outer periphery of the output shaft 3, thereby restricting its axial movement.

The pinion gear 4 which is engageable with an engine ring gear 36 is formed integrally with a spline tube 26 fitted on the output shaft 3 through a helical spline 25, and can move back and forth on the output shaft 3 along the helical spline 25.

The magnet switch 5 has, although not shown, a solenoid coil energized by turning on the key switch, a plunger slidably disposed within the hollow part of this coil, and the motor contact. With the attraction of the plunger by the magnetic force of the coil, the motor contact is closed, to thereby drive a lever 28 through a joint 27 linked to the plunger.

The lever 28, connected at one end to the joint 27 and at the other end to the outer periphery of the spline tube 26, can turn around the center of a fulcrum 29 provided in the front housing 20.

Figure 2:
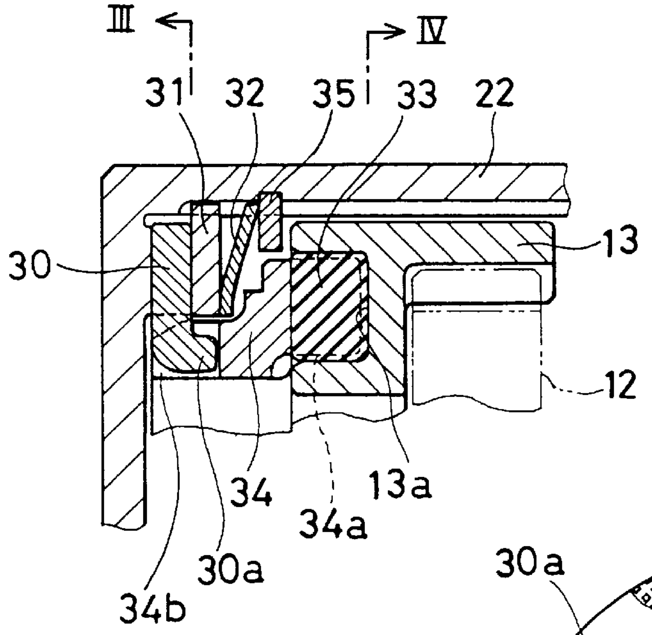
FIG. 2 is a sectional view of a shock absorbing device in the first embodiment.

The shock absorbing device, as shown in FIG. 2, includes such components as a rotary disk 30, a stationary disk 31, a disk spring 32, an elastic member 33, and a connecting member 34, and is disposed on the outer periphery of the one-way clutch within the center casing 22.

Figure 3:
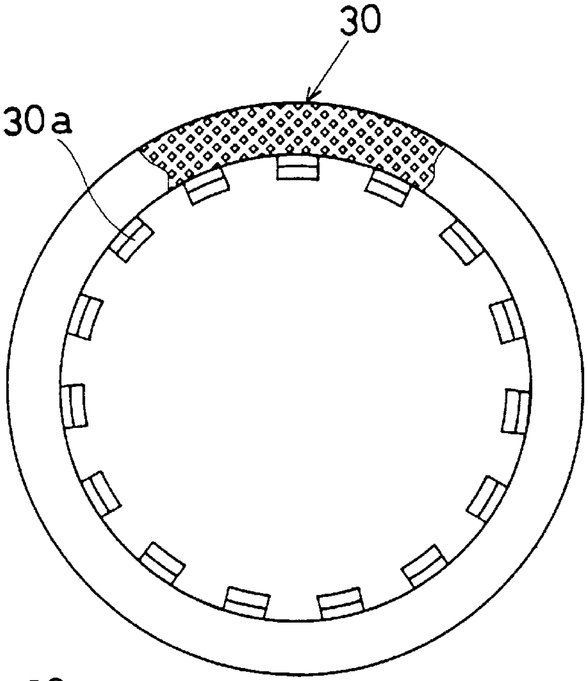
FIG. 3 is a front view of a rotary disk in the first embodiment.

The rotary disk 30 has a shape of ring and a roughened surface for frictional engagement as shown in FIG. 3, and is installed rotatably with respect to the center casing 22 and so as to be movable in a radial direction. On the inner periphery of the rotary disk 30 there are provided a plurality of claws 30*a* connected with the connecting member 34. The stationary disk 31, axially arranged to face the rotary disk 30, is installed nonrotatably but axially movably with respect to the center casing 22.

The disk spring 32 is cone-shaped, disposed adjacently to the stationary disk 31 at the opposite side of the rotatable disk 30, and positioned by a circlip 35 to the center casing 22, to thereby press the stationary disk 31 toward the rotary disk 30.

Figure 4:
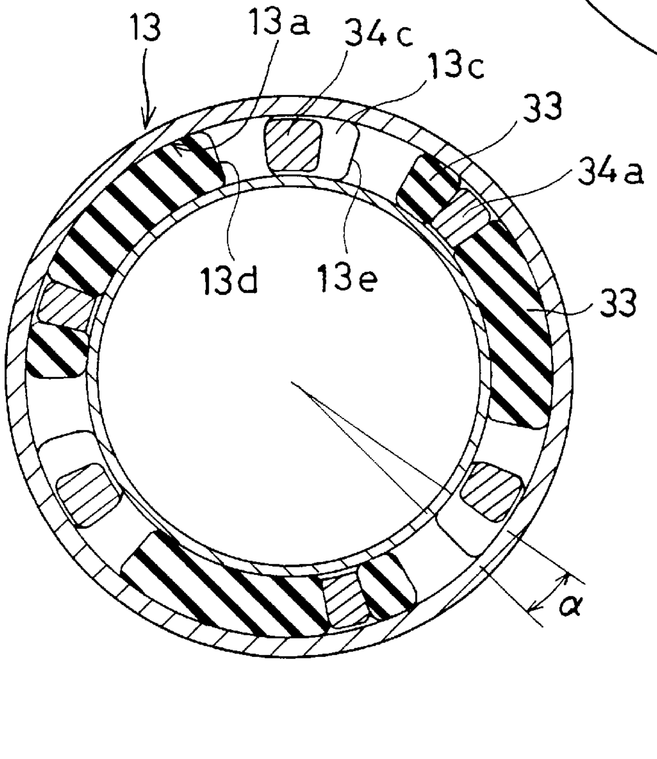
FIG. 4 is a front view showing an installed state of an elastic member in the first embodiment.

The elastic member 33 is made of, for instance, rubber and, as shown in FIG. 4, installed within an annular connecting recess section 13*a* provided integrally with the internal gear 13.

Figure 5A:
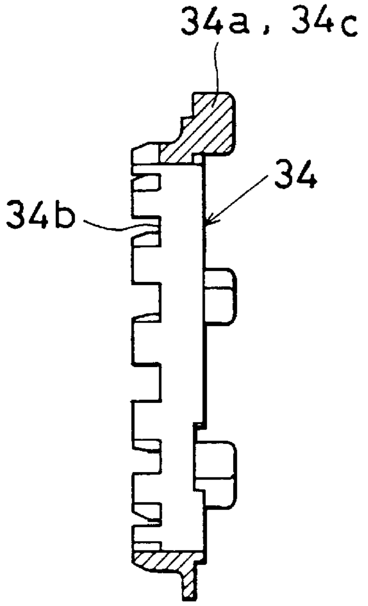
FIGS. 5A and 5B are respectively side and front views of a connecting member in the first embodiment.
Figure 5B:
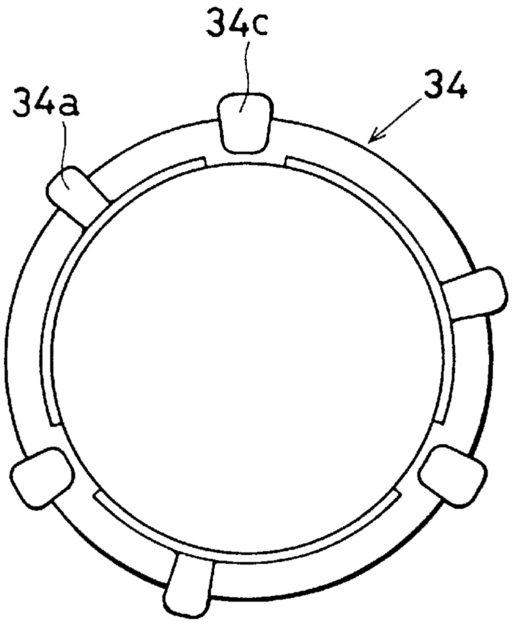

The connecting member 34 serves to connect the internal gear 13 with the rotary disk 30 through the elastic member 33, and forms an annular member as shown in FIGS. 5A and 5B. On the outer peripheral side of the connecting member 34, engaging projections 34*a* and 34*c* are provided in connecting recesses 13*a* and 13*c* of the internal gear 13. The engaging projection 34*a* is provided to receive the torque from the peripheral wall section 13*d* of the connecting recess 13*a* through the elastic member 33. The engaging projection 34*c* is arranged off the peripheral wall section 13*a* so that when the internal gear 13 turns a predetermined angle of rotation (α) in relation to the connecting member 34, the torque of the internal gear 13 will directly be transmitted to the connecting member 34.

The engaging projections 34*a* and 34*c* are housed within the connecting recesses 13*a* and 13*c* respectively with a slight clearance provided in a radial direction as shown in FIG. 2. Therefore, the connecting member 34 and the internal gear 13 are so installed as to make the same amount of radial relative displacement as the clearance between the two parts.

On the rotary disk side of the connecting member 34, as shown in FIG. 5A, there are provided a plurality of engaging recesses 34*b* in which the claws 30*a* of the rotary disk 30 are engaged. A slight clearance may be provided also between the claw 30*a* and the engaging recess 34*b* in order that the connecting member 34 can be radially displaced in relation to the rotary disk 30.

Therefore, the internal gear 13 connected to the rotary disk 30 via the connecting member 34 and the elastic member 33 is rotatable (rotation is restricted during ordinary torque transmission) with respect to the center casing 22, and is also radially displaceable.

The shock absorbing device restricts the rotation of the rotary disk 30 by the frictional engagement of the rotary disk 30 with the stationary disk 31 being pressed by the cone disk spring 32. When an excess torque exceeding a stationary torque generated by the frictional force between the stationary disk 31 and the rotary disk 30 is applied to the driving system, the rotary disk 30 slips (rotates) in relation to the stationary disk 31, absorbing the excess torque. Further, in case of a shock torque which is less than the excess torque, the rotary disk 30 will not slip in relation to the stationary disk 31, but the elastic member 33 is deformed within the connecting recess 13*a,* thereby absorbing the shock torque.

The first embodiment operates as follows.

When the key switch is turned ON, the solenoid coil in the magnet switch 5 is energized to attract the plunger, the lever 28 connected to the joint 27 turns clockwise around the center of the fulcrum 29. As a result, the spline tube 26 connected to the lever 28 is pushed out toward the ring gear 36 along the helical spline 25 on the output shaft 3, thereby moving the pinion gear 4 provided integrally with the spline tube 26.

In the meantime, when the motor contact in the magnet switch 5 is closed, the current flows from the battery to the starting motor 2, turning the armature 6 to generate a rotary torque. The rotation of the armature 6, after being reduced by the reduction mechanism, is transmitted to the output shaft 3 through the one-way clutch. Thus the pinion gear 4 rotates together with the output shaft 3 to come into mesh with the ring gear 36, thereby transmitting the torque of the starting motor 2 to the ring gear 36 to start the engine. Here, the excess torque occurring when the pinion gear 4 is engaged with the ring gear 36 is absorbed because the rotary disk 30 of the shock absorbing device slips on the stationary disk 31. Further, a shock torque (less than the excess torque at the time of engagement of the pinion gear 4 with the ring gear 36) caused by a change in engine load is absorbed by the deformation of the elastic member 33 within the connecting recess 13*a*.

After the engine has started, the key switch is turned to OFF to stop the operation of the magnet switch 5 and the plunger that has been attracted moves back to the initial position. The lever 28 connected to the joint 27 turns counter-clockwise. As a result, the spline tube 26 connected to the lever 28 is withdrawn along the helical spline 25 on the output shaft 3, and therefore the pinion gear 4 moves away from the ring gear 36, moving back on the output shaft 3 to return to the rest position. Furthermore, with the return of the plunger, the motor contact within the magnet switch 5 is opened to stop supplying the electric power to the starting motor 2, thus stopping the rotation of the armature 6.

In the present embodiment, the internal gear 13 is arranged movably in the radial direction with respect to the rotary disk 30, so that the centers of the reduction mechanism side and the one-way clutch side will coincide at the time of normal starting. Thus a deviation between the center portions of the reduction mechanism side and the one-way clutch side is reduced, thereby assuring good clutch performance.

In the miniaturized starter, each component part is demanded to have a high dimensional accuracy. Because the centering is carried out by utilizing the radial displacement of the internal gear 13, the component parts constituting the reduction mechanism and the one-way clutch are required only to have the same degree of dimensional accuracy as conventional ones.

Furthermore, the shock absorbing device can restrain an increased shock which will result when the starter 1 is designed to engage the pinion gear 4 with the ring gear 36 tightly. The shock absorbing device on the outer periphery of the miniaturized one-way clutch can decrease an unnecessary space within the center casing 22 without reducing the size of the center casing 22 along the external shape of the one-way clutch (without increasing the number of manufacturing processes). It is, therefore, possible to provide the starter 1 having good environmental stability such that little negative pressure is built up in the center casing 22 even if the starter 1 is suddenly cooled when the vehicle travels in a waterway or the like, thereby preventing the entry of water by the negative pressure into the center casing. Accordingly the grease which will be decreased in amount accompanying clutch miniaturization will not leak together with water from the clutch.

(Second Embodiment)

Figure 6A:
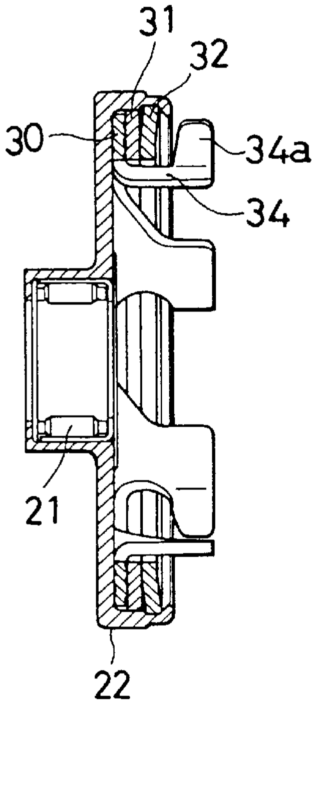
FIGS. 6A and 6B are respectively side sectional view and front view of a shock absorbing device in a second embodiment of the present invention.
Figure 6B:
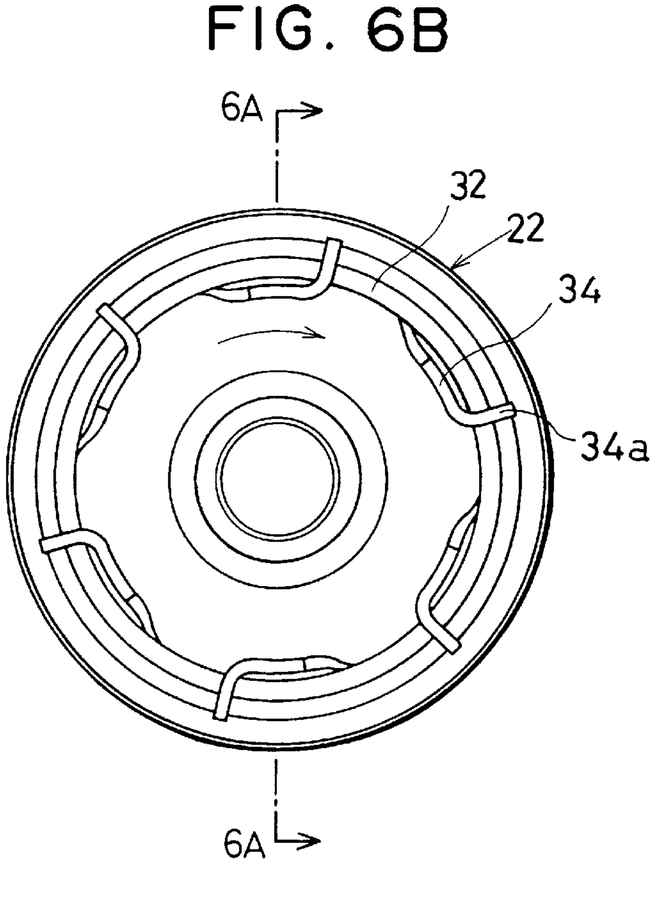

In the present embodiment, a rotary disk 30 and a connecting member 34 of a shock absorbing device are formed as one body as shown in FIGS. 6A and 6B.

The rotary disk 30 and the connecting member 34 can be formed by bending each connecting member 34 up nearly to a right angle in relation to the rotary disk 30 after punching, for instance, a metal plate by a pressing process into a predetermined shape having a plurality of connecting members 34 on the inner periphery of the rotary disk 30, and further by bending up an engaging projection 34*a* of each connecting member 34 to a predetermined angle as shown in FIG. 6B.

In the present embodiment also, the engaging projection 34*a* of the connecting member 34 is housed with a slight space provided in the radial direction within the connecting recess 13*a* of the internal gear 13 of the first embodiment, and is so installed that the connecting member 34 and the internal gear 13 can make a relative displacement in the radial direction. That is, the starter is so constructed that the internal gear 13 can be radially displaced in relation to the rotary disk 30.

(Third embodiment)

Figure 7:
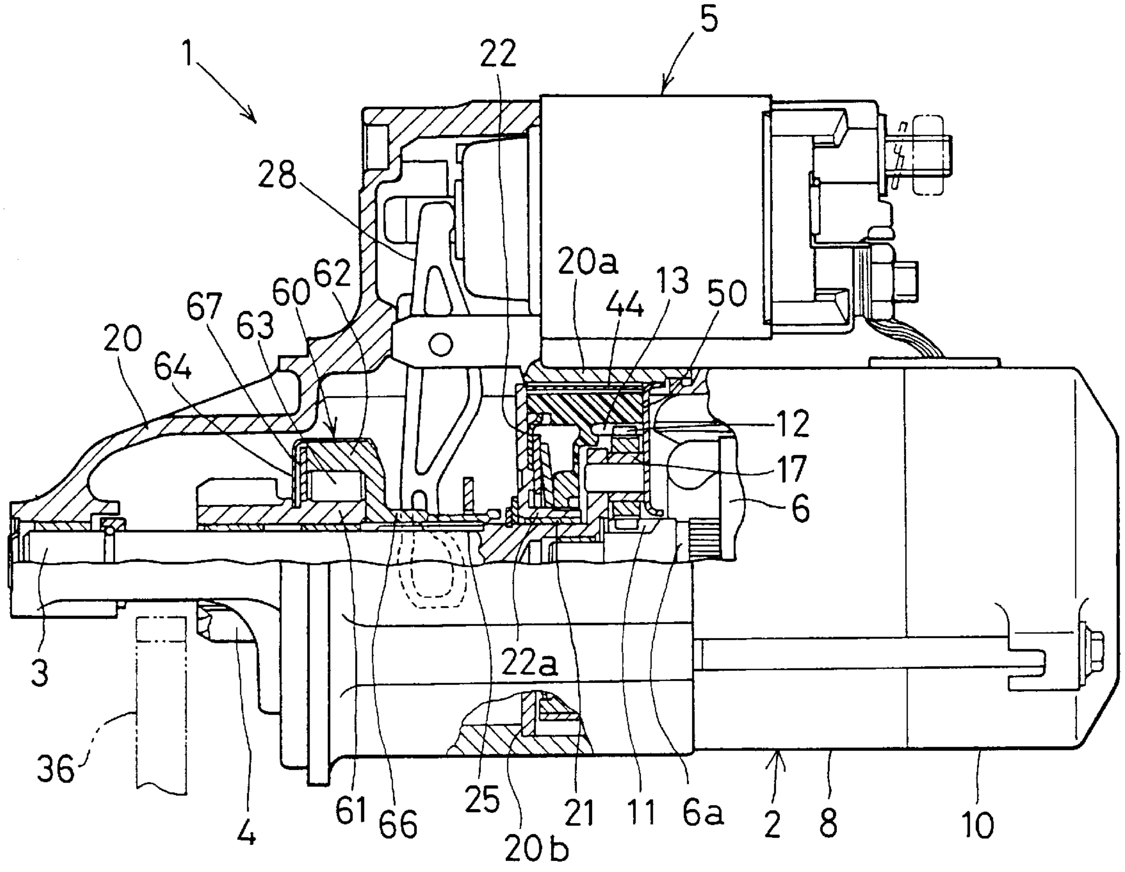
FIG. 7 is a partial sectional view of a starter according to a third embodiment of the present invention.

In a starter 1 according to the present embodiment shown in FIG. 7, a one-way clutch 60 is disposed near a pinion 4 and is comprised of an inner member 61, an outer member 62, rollers 63, a clutch cover 64 and a restricting plate 67. The inner member 61 is formed integrally with the pinion 4 and is movably fitted on an output shaft 3, while the outer member 62 is formed integrally with a spline tube 66 spline-fitted on the output shaft 3 and engaged with a lever 28 driven by a magnet switch 5. The rollers 63 are disposed radially between the inner member 61 and the outer member 62. The clutch cover 64 surrounds the outer member 62 and the restricting plate 67 which restricts axial movement of the rollers 63, and fixes the outer member 62 and the restricting plate 67 in position.

A center casing 22 has its outer periphery fitted with a step part 20*b* of a housing 20 and is restricted from turning or rotating by a cylindrical part 20*a* of the housing 20. The output shaft 3 disposed coaxially with an armature shaft 6*a* is supported rotatably radially inside an inner cylindrical part 22*a* of the center casing 22 via a bearing 21.

Figure 8:
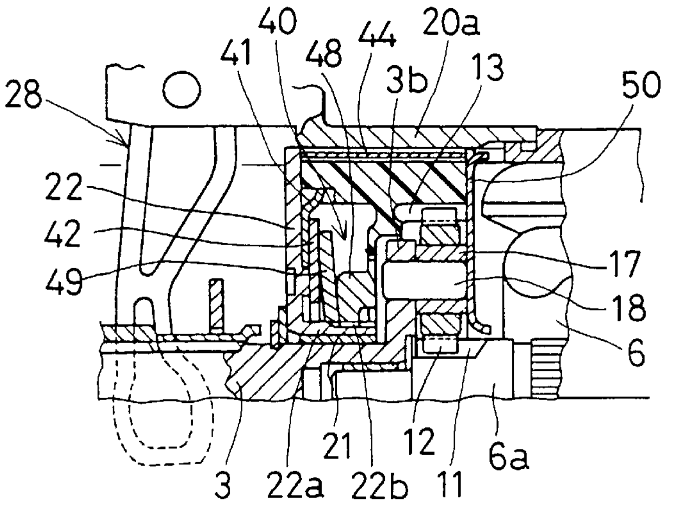
FIG. 8 is an enlarged sectional view of a shock absorbing device and a planetary gear reduction mechanism in the third embodiment.

As shown in detail in FIG. 8, a partition plate 50 is disposed between an armature 6 and a planetary gear reduction mechanism which is comprised of a sun gear 11, planetary gears 12 and an internal gear 13 and disposed radially inside the cylindrical part 20*a* of the housing 20. The planetary gears 12 are supported rotatably around respective pins 18 fitted into a flange 3*b* formed at one end of the output shaft 3 so that the planetary gears 12 revolve around the sun gear 11 while rotating around the pins 18. The internal gear 13 is made of resin impregnated with glass fibers, while the housing 20 is made of aluminum alloy.

A shock absorbing device 40 is disposed adjacently to the planetary gear reduction mechanism. In shock absorbing device 40, a first friction plate 41 engages the internal gear 13 to restrict turning of the internal gear 13 while allowing turning of the internal gear 13 to a certain extent. For allowing the internal gear 13 to turn to the certain extent, a space is provided between the outer periphery of the internal gear 13 and the inner periphery of the cylindrical part 20*a* of the housing 20.

Figure 9A:
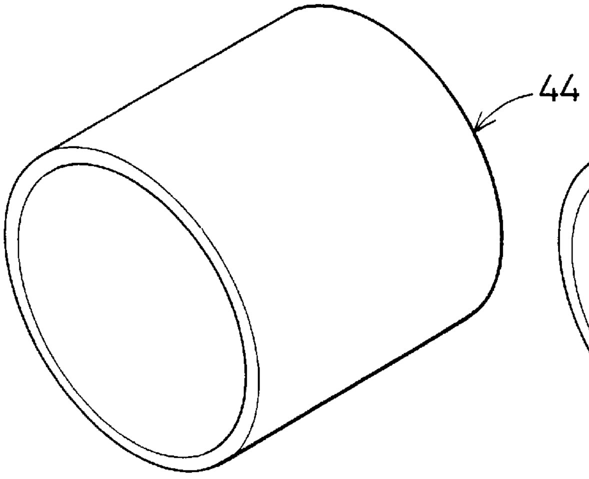
FIGS. 9A through 9C are perspective views of a cylindrical member in the third embodiment.
Figure 9B:
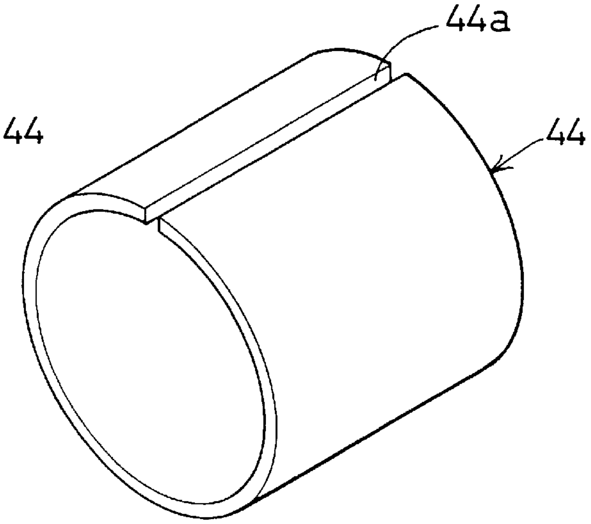
Figure 9C:
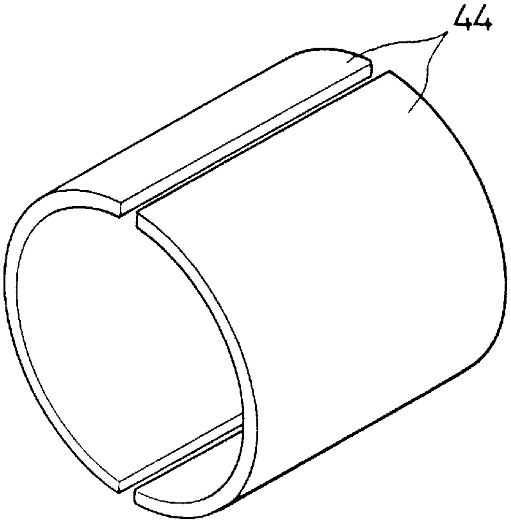
Figure 9D:
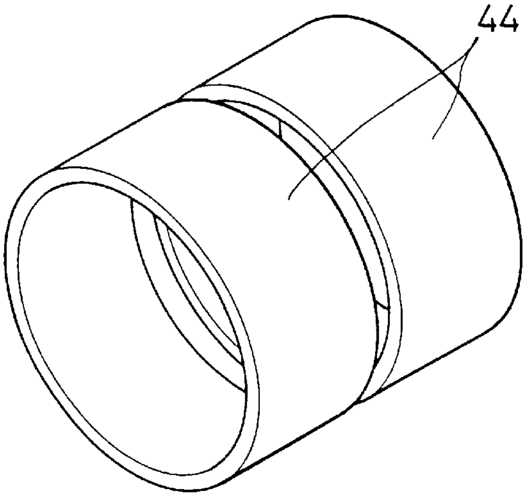
Figure 10:
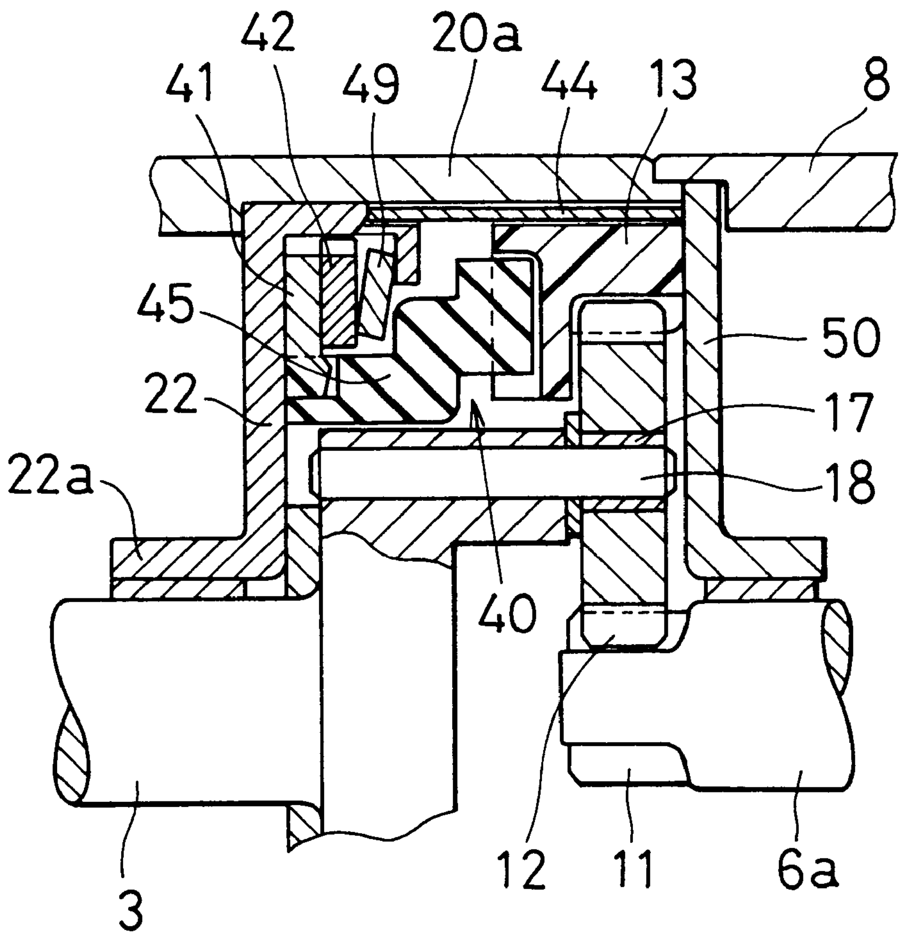
FIG. 10 is an enlarged sectional view of a shock absorbing device and a planetary gear reduction mechanism in a fourth embodiment.

In this clearance, a cylindrical member 44 made of a hard metal such as tool steel or high carbon steel is disposed relatively movably against the cylindrical part 20*a* and the internal gear 13. That is, small clearances are maintained between the cylindrical member 44 and the cylindrical part 20*a* and between the internal gear 13 and the cylindrical member 44. The cylindrical member 44 may be any form which is a simple cylinder form as shown in FIG. 9A, which has an axially extending slit 44*a* as shown in FIG. 9B, or which is divided into a plurality of parts circumferentially or axially as shown respectively in FIG. 9C or 9D. The axial length of the cylindrical member 44 is set to be longer than that of the internal gear 13 and substantially equal to the axial distance between the partition plate 50 and the center casing 22.

The shock absorbing device 40 is comprised of, in addition to the first friction plate 41, a second friction plate 42, an adjusting screw 48 and a disk spring 49. The first friction plate 41, receiving a biasing force of the disk spring 49 through the second friction plate 42, is maintained in frictional engagement with both the center casing 22 and the second friction plate 42. The adjusting screw 48 is in thread engagement with the male thread formed on the outer periphery of the cylindrical part 22*a* of the center casing 22 thereby to adjust the biasing force. The rotation of the first friction plate 41 is restricted normally by the frictional engagement against the center casing 22 and the second friction plate 42. When an excessive torque exceeding the stationary torque provided by the frictional engagement is applied, the first friction plate 41 turns together with the internal gear 13 to absorb the excessive torque.

In operation, the starter according to this embodiment operates in substantially the same way as in the foregoing embodiments. When the teeth of the pinion 4 come into contact with the teeth of the ring gear 36 at high speeds in the process of engagement of the pinion 4 with the ring gear 36, a large impact shock occurs between the pinion 4 and the ring gear 36. With an excessive torque which is caused by this engagement and exerts in turn on a pinion driving structure in the starter 1, the first friction plate 41 engaged with the internal gear 13 slides against the center casing 22 and the second friction plate 42 and causes the internal gear 13 to turn together. When the internal gear 13 turns eccentrically because of backlash between the gears in the planetary gear reduction mechanism, the internal gear 13 rotates relatively against the cylindrical member 44 in sliding contact with the inner periphery of the cylindrical member 44 disposed between the cylindrical part 20*a* of the housing 20 and the internal gear 13. Because the cylindrical member 44 is maintained relatively movably against the cylindrical part 20*a,* the cylindrical member 44 will also turn together with the internal gear 13.

In this operation, even when the internal gear 13 rotates relatively to the cylindrical member 44 in sliding contact therewith, wear between the internal gear 13 and the cylindrical member 44 will be reduced to a minimum because of the high hardness of the cylindrical member 44. Further, because the cylindrical member 44 restricts the direct contact between the internal gear 13 and the cylindrical part 20*a,* the eccentric rotation of the internal gear 13 never slides on the cylindrical part and hence the wear of the cylindrical part can be reduced. It may occur that the contacting portions between the cylindrical part 20*a* and the cylindrical member 44 wear during the turning of the cylindrical member 44 together with the internal gear 13. However, the wear of the cylindrical part 20*a* of the housing 20 will be minimal, because the cylindrical member 44 rotates only intermittently and more slowly than the internal gear 13 does.

Due to the wear of the cylindrical member 44 and the internal gear 13, which are relatively movable, the clearance between the inner periphery of the cylindrical member 44 and the outer periphery of the internal gear 13 may be reduced to a minimum so that the outer diameter of the cylindrical part 20*a* may be reduced accordingly.

Still further, with the axial length of the cylindrical member 44 being substantially equal to the axial distance between the partition plate 50 and the center casing 22, the cylindrical member 44 functions as a spacer as well for assuring an axial spacing between the partition plate 50 and the center casing 22. With the cylindrical member 44 being disposed between the center casing 22 and the partition plate 50, the center casing 22 can be restricted from moving toward the partition plate 50, even when the center casing 22 is pushed toward the starting motor side through the helical spline 25 at the time of engagement of the pinion 4 with the ring gear 36.

(Fourth Embodiment)

In the present embodiment, a shock absorbing device 40 is modified from that in the third embodiment while maintaining the same or similar construction of the third embodiment for the other construction of a starter. More specifically, an elastic member 45 made of rubber or the like is disposed between an internal gear 13 and a first friction plate 41 as in the first embodiment. According to this embodiment, when an excessively large impact torque is applied to a driving structure in a starter, the first friction plate 41 slidingly turns against frictional engagement forces between a center casing 22 and a second friction plate 42 to absorb the large torque. Provided that the impact torque is relatively small, the first friction plate 41 does not slidingly turn but the elastic member 45 deforms or twists to absorb such impact torque.

In this embodiment as well, a cylindrical member 44 is disposed in a space provided between the internal gear 13 and a housing cylindrical part 20*a*. The axial length of the cylindrical member 44 is set to be substantially equal to the axial distance between the center casing 22 and the partition plate 50.

The present invention should not be limited to the disclosed embodiments but may be modified in various ways without departing from the scope and spirit of the invention. One such modification may be that a cylindrical member used in the third and the fourth embodiment is used also in the first and the second embodiment.

What is claimed is:

1. A starter comprising:

a starting motor having an armature rotatable by electric power supplied thereto and an armature shaft supporting the armature thereon;

a planetary gear reduction mechanism for reducing rotational speed of the armature and having a sun gear formed on the armature shaft, planetary gears engaged with the sun gear and an internal gear engaged with the planetary gears;

an output shaft disposed to be driven by the starting motor through the reduction mechanism;

a pinion disposed on the output shaft so as to be movable through a helical spline and so as to be engageable with an engine ring gear to transmit rotation of the output shaft to the ring gear;

a shock absorbing device operatively coupled with the reduction mechanism to turn the internal gear when an impact torque is applied to the reduction mechanism at the time of engagement of the pinion with the ring gear, thus absorbing the impact torque;

a housing surrounding the reduction mechanism and being disposed to have a space between an inner periphery thereof and an outer periphery of the internal gear; and a cylindrical member movably disposed in the space and relatively rotatable against at least one of the housing and the internal gear.

2. The start according to claim 1, further comprising:

a partition plate disposed between the reduction mechanism and the armature; and a center casing disposed adjacent the shock absorbing device at a side of the pinion and fixedly against the housing, the center casing rotatably supporting the output shaft;

wherein the cylindrical member is disposed axially between the center casing and the partition plate and has an axial length substantially equal to an axial distance between the center casing and the partition plate.

3. The starter according to claim 1, further comprising:

a center casing disposed adjacent to the shock absorbing device at a side of the pinion;

wherein the shock absorbing device includes a friction plate engaged with the internal gear for integral rotation therewith, and a spring biasing the friction plate against the center casing so that the friction plate slidingly rotates on the center casing only when the impact torque exceeds a predetermined value.

4. The starter according to claim 1, further comprising:

a center casing disposed adjacent to the shock absorbing device at a side of the pinion;

wherein the shock absorbing device includes a friction plate disposed in sliding contact with the center casing, a spring biasing the friction plate against the center casing, and an elastic member disposed to engage the internal gear with the friction plate so that the elastic member deforms to restrict the friction plate from rotating upon application of an impact torque lower than a predetermined value and to allow the friction plate to rotate upon application of the impact torque higher than the predetermined value.

5. The starter according to claim 1, wherein:

the cylindrical member has a hardness higher than that of the housing.

6. A starter comprising:

a starting motor having an armature rotatable by electric power supplied thereto and an armature shaft supporting the armature thereon;

a planetary gear reduction mechanism for reducing rotational speed of the armature and having a sun gear formed on the armature shaft, planetary gears engaged with the sun gear and an internal gear engaged with the planetary gears;

an output shaft disposed to be driven by the starting motor through the reduction mechanism;

a pinion disposed on the output shaft so as to be movable through a helical spline and so as to be engageable with an engine ring gear to transmit rotation of the output shaft to the ring gear;

a shock absorbing device operatively coupled with the reduction mechanism to turn the internal gear when an impact torque is applied to the reduction mechanism at the time of engagement of the pinion with the ring gear, thus absorbing the impact torque;

a housing surrounding the reduction mechanism and being disposed to have a space between an inner periphery thereof and an outer periphery of the internal gear; and a member disposed in the space to contact the internal gear only when the internal gear moves eccentrically and to restrict the internal gear from directly contacting the housing.

* * * * *